Nov. 8, 1960

H. H. VANDERZEE ET AL

SCANNING CONTROL MECHANISM FOR PHONOGRAPH RECORD CHANGER 2,959,417

Filed May 6, 1957

5 Sheets-Sheet 1

INVENTORS
H. H. Vanderzee and
George S. Brown, Jr.
BY
L. F. Hammand
Att'y.

INVENTORS.
H. H. Vanderzee and
George S. Brown, Jr.
BY
L. F. Hammond. Atty.

SCANNING CONTROL MECHANISM FOR PHONOGRAPH RECORD CHANGER

INVENTORS.
H. H. Vanderzee and George S. Brown, Jr.
BY L. F. Hammond, Atty.

INVENTORS
H. H. Vanderzee and
George S. Brown, Jr.
By: L. F. Hammond, Atty.

INVENTORS.
H. H. Vanderzee and
George S. Brown, Jr.
By: L. F. Hammond Atty.

United States Patent Office 2,959,417

Patented Nov. 8, 1960

2,959,417

SCANNING CONTROL MECHANISM FOR PHONOGRAPH RECORD CHANGER

Harry Herbert Vanderzee, Bangor, Wis., and George S. Brown, Jr., Grand Rapids, Mich., assignors, by mesne assignments, to Automatic Music, Inc., Grand Rapids, Mich., a corporation of Delaware Filed May 6, 1957, Ser. No. 657,207

3 Claims. (Cl. 274—10)

The present application is a continuation-in-part of application Serial Number 466,554 filed in the United States November 3, 1954.

The invention relates to record changing mechanisms for automatic phonographs, and particularly to an improved scanning control mechanism suited to record changers having selecting devices capable of making advance selection of several of the selections available in the record magazine of the machine.

It is the general aim of the invention to provide a machine wherein several or many selections may be made and "remembered" by the selector mechanism, so that all records selected will be played before the machine comes to rest, but so arranged that the machine will stop quite promptly after playing the last record. In the past, this has ordinarily required a multiplicity of individual electrical switches or contactors associated with the selector mechanism or troublesome "gang" or "bail" switches mechanically coupled to the selector.

It is the primary aim of the present invention to avoid this complexity of structure, and to provide for the control of the record changer mechanism by what may be termed a "scanning control" unit. As disclosed, this scanning control unit avoids the need of control switches operated by the selector stops. Also, it avoids the relatively long period of idle movement characteristic of machines arranged to scan the magazine and return to a "home" position after the last play. Instead, it is so arranged that, after each selection, the machine will run until the shiftable record magazine has moved slightly more than one complete cycle of its movement. It is to be noted, however, that this cycle of movement is measured from the position of the machine at the time of making the last selection, rather than its position when the last record is played. Thus, the final scanning cycle of the magazine begins before the last selections are played, and may be almost completed before the last selected record is reached irrespective of whether one or val. The scanning control unit is reset to zero or starting position upon each new actuation of the manual selection devices, and will thus keep the mechanism in operation until the playing of all selected records is completed.

An illustrative embodiment of the invention is shown in the drawings of this specification wherein.

Figures 1, 2:
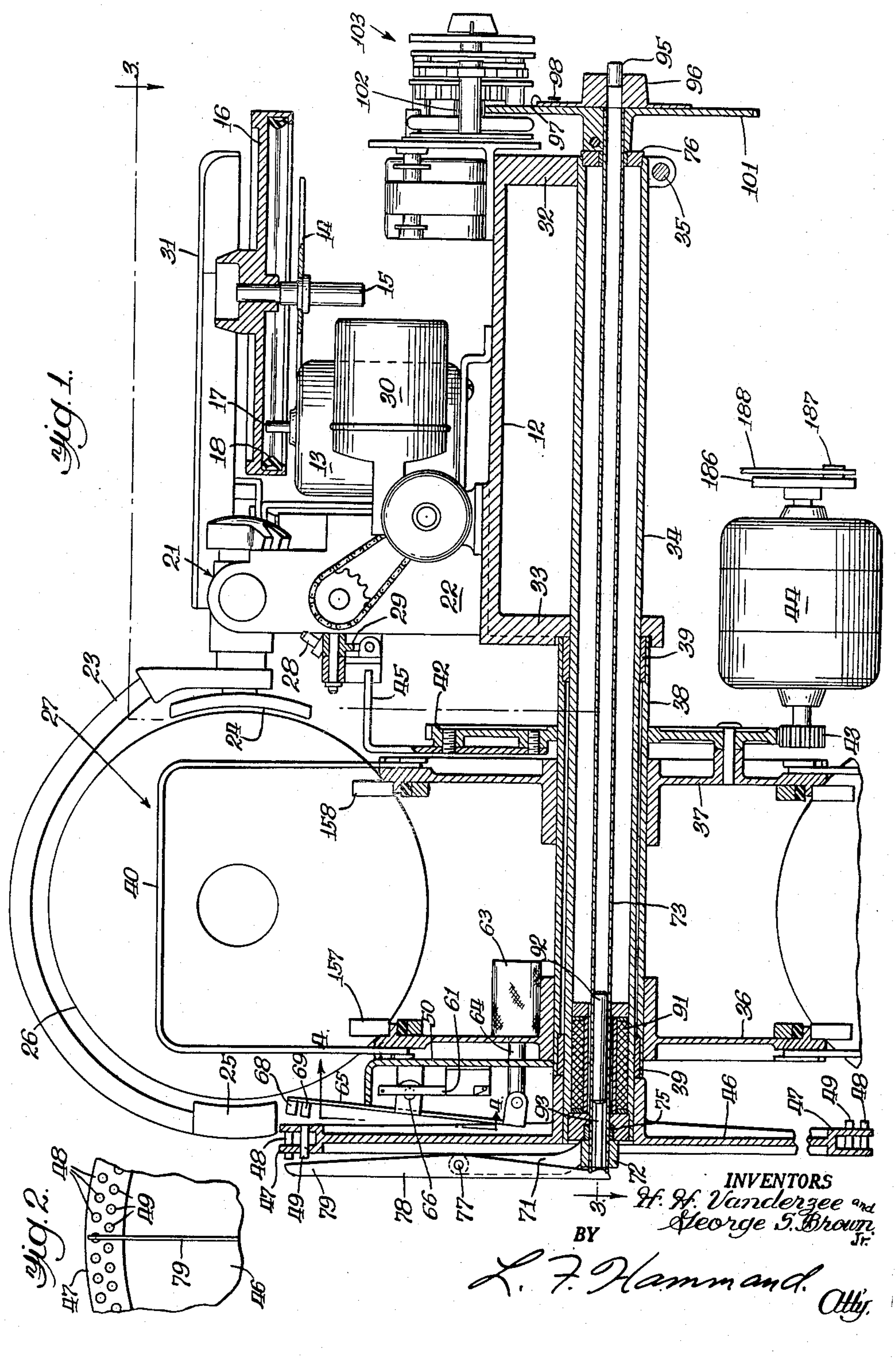
Figure 1 is a central sectional view through a phonographic record changer utilizing the principles of the present teachings.
Figure 2 is a fragmental detail view of a portion of the rim of a selector wheel employed in the illustrated record changer.

The principal operating parts of the record changing mechanism here illustrated are mounted on and supported by a base casting 12. The base 12 supports a turntable driving motor 13 and supporting plate 14 upon which a vertical turntable pivot stud 15 is carried. A turntable 16 is mounted in any conventional manner. As shown, it is freely pivoted on a fixed stud 15 and is driven through conventional speed-reducing drive mechanism (not shown) between the armature shaft of the motor 13 and the driving pinion 17, which is held in light frictional engagement with a resilient inner ring or lining 18 on the turntable rim.

A transfer mechanism, generally indicated at 21, is mounted on a pedestal 22 affixed to the upper face of the base 12 in a position closely adjacent the rim of the turntable. The transfer mechanism includes a semicircular record arm 23 having V-blocks 24 and 25 on its inner and outermost ends respectively, to engage the opposite peripheral edges of a disc record 26 in the magazine 27. This transfer mechanism serves to lift a selected record from the magazine and move it from its vertical position in the magazine to horizonal position on the turntable, in a well known manner. It will be understood, of course, that the record transfer mechanism includes selective devices such as paired turning pins 28 mounted in a shiftable rocker mount 29 so that the mechanism, when energized by its driving motor 30 will place the record on the turntable with either face uppermost according to the selection made.

The record magazine 27 of the mechanism chosen for illustration of the present invention is of toroidal form, having the individual records in generally face-to-face relationship with each other, but radially disposed so that they form a substantially complete circle or "doughnut" having its central axis horizontally disposed at a level somewhat below the axis of the record transfer mechanism, so that the uppermost record 26 of the magazine is in alignment with the V-lifting blocks 24 and 25 of the record arm 23.

As shown in the present drawings, the base 12 of the machine includes a pair of downwardly extending bracket arms 32 and 33 in which a hollow tube or sleeve 34 is mounted. Clamping means 35 are provided to hold the sleeve rigidly in the brackets, with one end of the sleeve projecting rearwardly from the bracket 33 to support the record magazine.

The record magazine 27 consists essentially of a pair of flanged circular discs 36 and 37 each having their hubs mounted on a sleeve 38 surrounding the rearward end of the sleeve 34 and rotatably journaled thereon in bushings 39. The discs 36 and 37 serve as mounts for a plurality of U-shaped wire bails 40 disposed between the individual records 26 of the magazine to serve as separators therefor. Semicircular guide rails 41 (Figure 3), or other retaining means may be arranged around the lower half of the magazine to prevent accidental dislodgement of the records as the magazine is rotated.

The magazine rotates as a unit about the sleeve 34. To this end the magazine is provided with a gear 42 secured to the forward face of the disc 37 and arranged to be driven by the pinion 43 of a traverse motor diagrammatically illustrated at 44. It is contemplated that an arm 45 may be provided on the magazine to engage the rocker mount 29 so that the record turning mechanism of the transfer head may be shifted according to forward or reverse motion of the record magazine.

The selector of the present invention is preferably of circular shape, to correspond to the shape of the magazine. As illustrated, the selector includes a relatively large disc-like wheel 46 having its hub affixed to the rearmost end of the horizontal sleeve 34. The selector wheel has a grooved rim 47 which is drilled to receive an outer row of selector stop pins 48, and an inner row of selector stop pins 49. These are preferably staggered from each other as best shown in Figure 2. The selector stops 48 and 49 may comprise simple cylindrical pins, longitudinally slidable in the bores of the selector wheel. They may be shifted between their normal (unset) position shown at the upper rim of the wheel wherein they project to the left, and the position shown at the lower rim of the wheel wherein they are "set," that is, moved to the right to project on the forward face of the wheel rim. Additional friction means (not shown) but consisting of V-shaped leaf springs disposed between adjacent pairs of pins may be provided to hold each individual pin in position, if required.

Record selections are made by moving one or more of the individual selector pins 48, 49 to the right, as viewed in Figure 1, so that one end of the pin projects from the forward face of the wheel rim 47. The magazine is provided with sensing fingers (not shown) and switches 61 mounted on a bracket 50 the rear face of the magazine disc 36, so that when the magazine is caused to rotate by the motor 44, the selected record is caused to stop in registry with the record transfer arm 23.

The transfer mechanism places the record on the turntable either side up, according to the setting of the turning pins 28. The contacts of the switches 61 are interconnected to the traverse motor 44, transfer motor 30, and turntable motor 13 through appropriate control circuits so that when a selection is made, the record magazine will be brought to a stop with the selected record in registry with the record transfer arm. The record is then lifted from the magazine and placed on the turntable by the arm 23 of the transfer mechanism 21.

Concurrently, the selection being played is canceled by operation of one of a pair of solenoids 63, the plungers 64 of which serve to swing rocker arms 65 about pivots 66 on the bracket 50. The arms 65 have curved reset fingers 68, 69 traversing the ends of the outer and inner rows of stop pins respectively, so that when either solenoid is energized, a reset finger is brought against the end of the appropriate selector stop, pushing the selector pin rearwardly until its forward end is flush with the front face of the wheel rim.

In the present invention it is contemplated that the selector stop pins will be set by manipulation of electrical push buttons or by actuation of a remote control coin controlled impulse transmitter, such as conventionally used in connection with automatic phonographs. The selector stop setting mechanism includes a scanning arm 71 having its hub 72 mounted on the innermost end of a slender rotatable tube 73 which extends through the entire length of the magazine supporting sleeve 34, and is journaled in appropriate bearings 75 at the rear of the machine and 76 at the front thereof. The arm 71 is bifurcated and has a pivot pin 77 near its outer end, with a rocker arm 78 mounted on the pivot and including a finger portion 79 extending to the outer rim of the selector wheel and arranged to engage the pins 48, 49 and move them individually. Since the pins 48 and 49 are staggered or offset from each other (Figure 2), the relatively narrow edge of the selecting finger 79 may engage and move any one pin without affecting the others.

The arm 79 is rocked about its pivot 77 by electromagnetic means, including a solenoid winding 91 positioned within the tube 34 but exteriorly of the tube 73, with the solenoid core 92 positioned within the tube 73 so that upon energization of the coil 91 the core 92 is drawn to the left and its actuating plunger 93 caused to project from the left end of the tube 73 and to engage the inner end of the rocker arm 78, whereby the finger 79 is caused to engage one of the pins 48, 49 and make a selection. When the coil is denergized, the parts are returned to their normal position by appropriate springs (not shown).

Selections may be made manually by rotating a knob 96 affixed to the forward end of the tube 73 to shift the finger 79 to any desired selector stop pin, and then depressing an electric push button 95 to energize solenoid winding 91. If desired, a series of numerals or other indicia may be inscribed on the dial 97, so that any desired selection may be made by bringing its numeral into alignment with an indicator 98 before depressing the push button. One selection is made at a time, yet the action of the selector is cumulative, and any or all desired records may be selected by shifting the stop pins corresponding thereto.

While manual operation as described above is contemplated for certain applications, selections will ordinarily be made by electrical selectors of either the multiple coded push button type or with remote wall boxes using presently known types of impulse transmitters, or with both. These results are accomplished in the present invention by providing the forward end of the selector control tube 73 with a relatively large gear 101 adapted to mesh with and be driven by the driving pinion 102 of a selector actuating and indexing assembly 103.

Figures 4, 5:
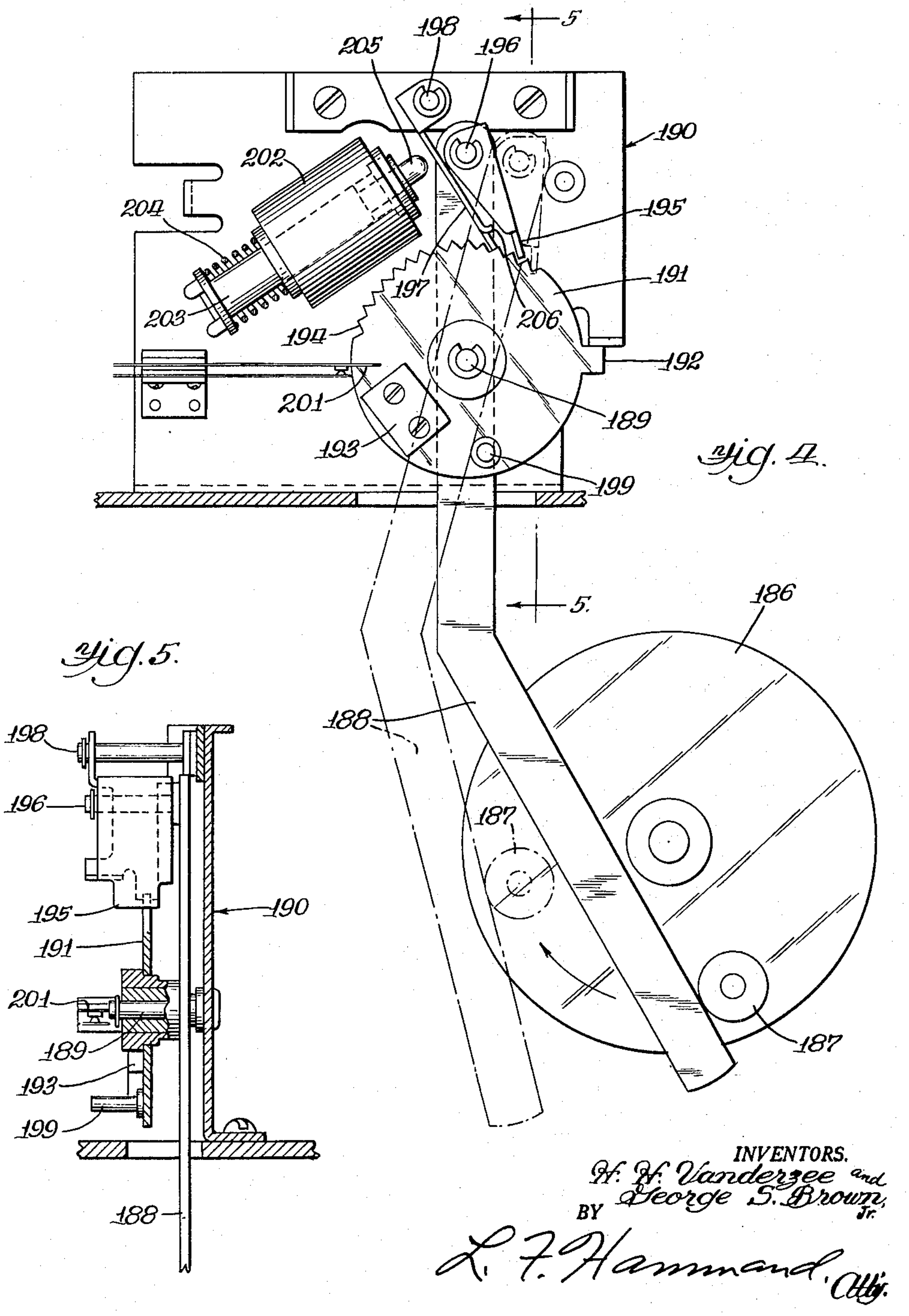
Figure 4 is a detail front view of a scanning control device adapted to control the operation of the magazine and bring it to a halt after all selected records have been played.
Figure 5 is a detail sectional view thereof, taken substantially on the plane of the line 5—5 of Figure 4.

It will be understood that for proper operation of the mechanism the playing of records selected from the magazine should continue until all of the selector pins 48, 49 in operating position have been engaged by the sensing mechanism, and that the magazine should stop when all selected records have been played. To this end the traverse motor 44 utilized in driving the magazine (Figure 1) may be provided with a crank disc 186 arranged to actuate a scanning control mechanism 190, best illustrated in Figures 4 and 5 of the drawings.

The scanning control unit serves to cause the magazine to continue its scanning movement as long as there are any of the stops 48, 49 in "set" position, but brings the magazine to a stop after all selected records have been played. As will be seen from Figure 4, the scanning control unit 190 is driven directly from the crank disc 186 on the shaft of motor 44. The disc is provided with a crank stud 187 thereon arranged to engage an operating lever 188 pivotally mounted on a fixed stud 189 of the scanning control unit. The stud 189 also carries a notched cycle-measuring wheel 191 having a stop portion 192 to limit its movement in a counterclockwise direction, and having a weighted portion 193 to cause the wheel to tend to movement in a return to the position shown after any clockwise direction. The wheel is, however, provided with a series of notches 194, and a dog 195 secured to a pivot 196 on the extreme upper end of operating lever 188 is arranged to engage the notches 194. A second dog 197 is mounted on a stationary pivot 198 to prevent unwanted return movement of the wheel 191. Thus, whenever the magazine driving motor 44 is energized, the rotary movement of its armature shaft will cause the crank disc 186 to be rotated and the rotary movement of the disc will cause the crank pin 187 to repeatedly engage the lower end of the arm 188 and move the arm against a spring (not shown) so it swings back and forth between the dotted and solid line positions illustrated. The action of the crank 187 in this respect will be the same irrespective of whether the disc 186 is moving in a clockwise direction or counterclockwise direction. It follows that the operation of the mechanism is the same with either direction of rotation of the magazine. In either case, as the arm 188 is moved back and forth, the notches 194 of the counting wheel 191 will advance the wheel in a step-by-step clockwise movement. This motion, if continued through a complete scanning cycle of the magazine, will cause the pin 199 to engage the contacts 201 and break the circuit to the motor 44, bringing the magazine to a halt. The switch 201 will not be actuated so long as any selector pin 48, 49 remains in displaced position, however, since a resetting solenoid 202 is tripped whenever a selection is made. The solenoid 202 is electrically connected in parallel with the selector solenoid 91 (Figure 1), so that whenever a selection is made the core 203 of the solenoid will move inwardly against the action of a return spring 204 and project a plunger portion 205 into engagement with the dog 197. The dog is further provided with a projection 206 adapted to engage and release the dog 195. Thus, every actuation of the solenoid 202 releases both dogs and permits the wheel 191 to return to its initial position under the influence of the return weight 193.

Figure 6:
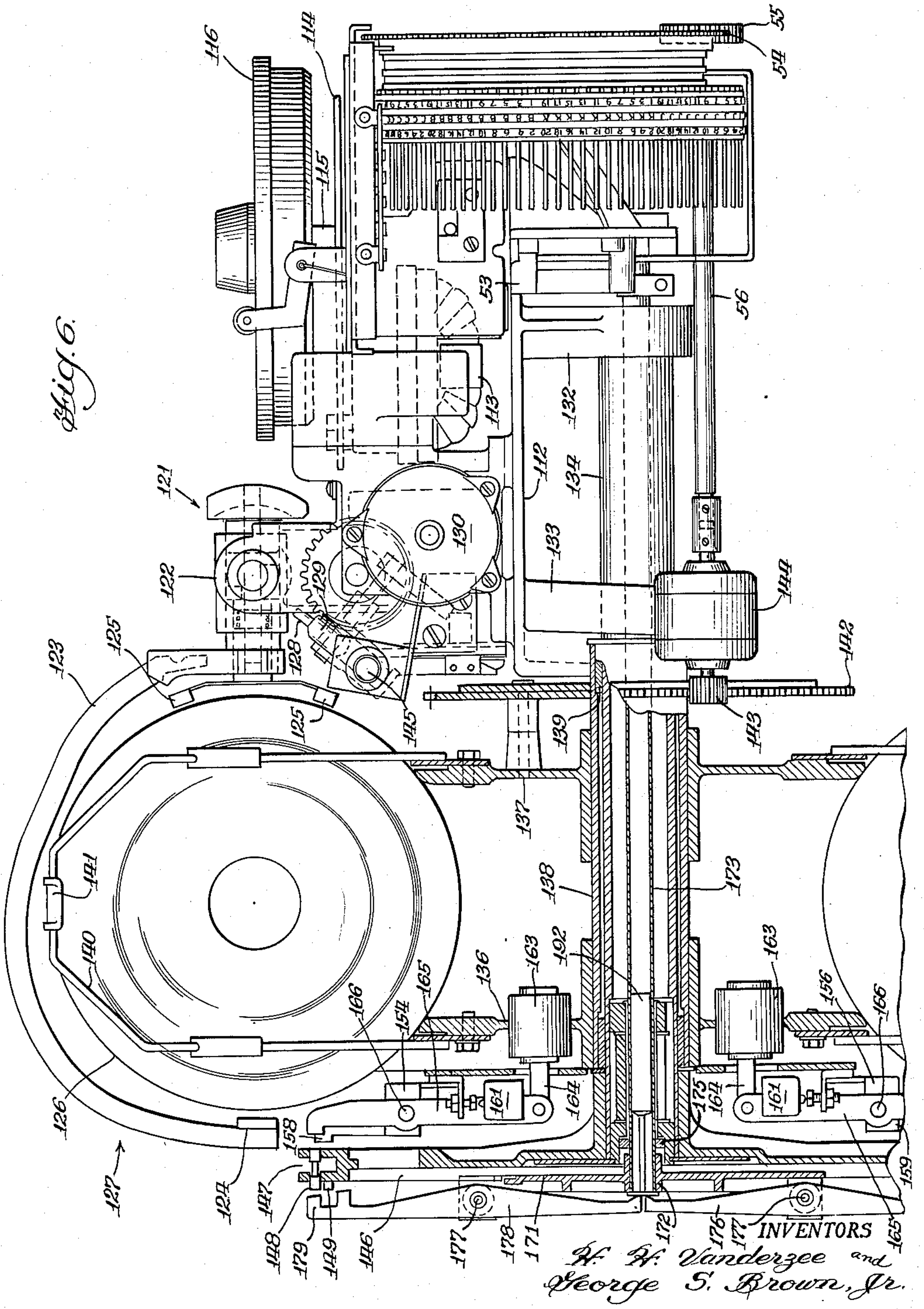
Figure 6 is a side elevational view, partly in section, showing a somewhat modified form of the record changer mechanism.
Figure 7:
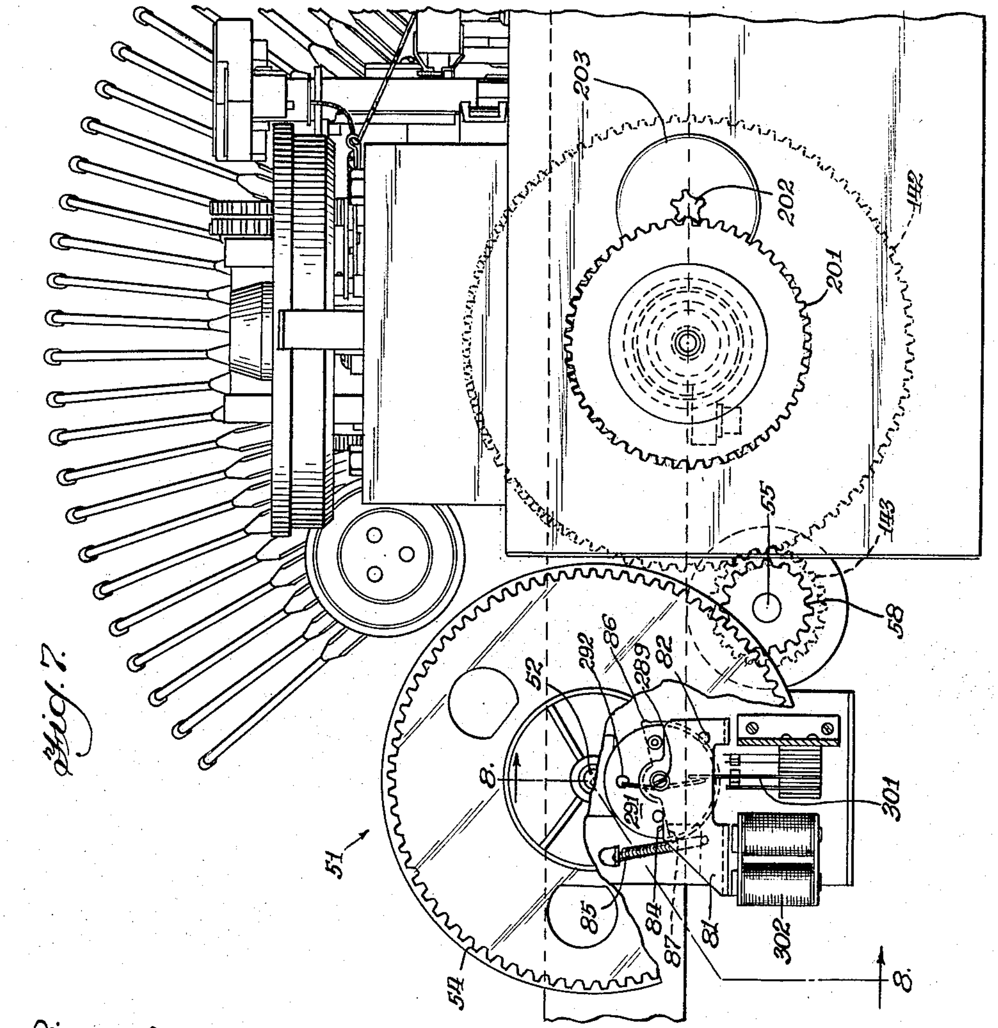
Figure 7 is a front elevational view thereof, partly broken away to show the improved scanning control assembly.
Figure 8:
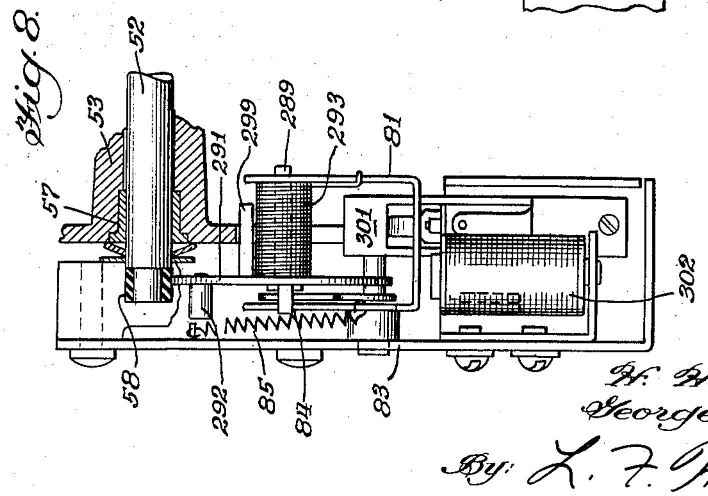
Figure 8 is a fragmental detail sectional view taken substantially on the plane of the line 8—8 of Figure 7.

The modified form of the invention illustrated in Figures 6 to 8 inclusive is much the same in structure and operation as the mechanism just described, including a base casting 112, turntable motor 113 with a supporting plate 114 carrying a pivot stud 115 on which the turntable 116 is mounted for rotation. The transfer mechanism 121 includes a fixed pedestal 122 on which the semi-circular transfer arm 123 is provided to move the record discs 126 from the magazine 127 to the turntable as heretofore. The arm 123 has V-blocks 124 and 125 to facilitate lifting the record, and paired turning pins 128 are provided on a shiftable rocker mount 129 so as to cause the record transfer arm to position either face of the record upwardly on the turntable, as desired. The arm is powered by the transfer motor 130.

The base plate 112 has downwardly depending bracket arms 132 and 133 supporting a horizontal sleeve 134 which projects rearwardly from the frame of the machine and carries a pair of hub discs 136 and 137 interconnected by a rotatable sleeve 138 mounted on bushings 139 rotatable on the outer surface of the tube 134. The magazine is of wheel form and made up of a multiplicity of U-shaped wire bails 140 rotated by the traverse motor 144, which has a driving pinion 143 engaging the ring gear 142 affixed to the hub disc 137. As shown, the bails forming the magazine each have a molded center piece 141 on which a retaining belt may be positioned to hold records against dislodgment from the lower half of the magazine as it is rotated.

Figure 3:
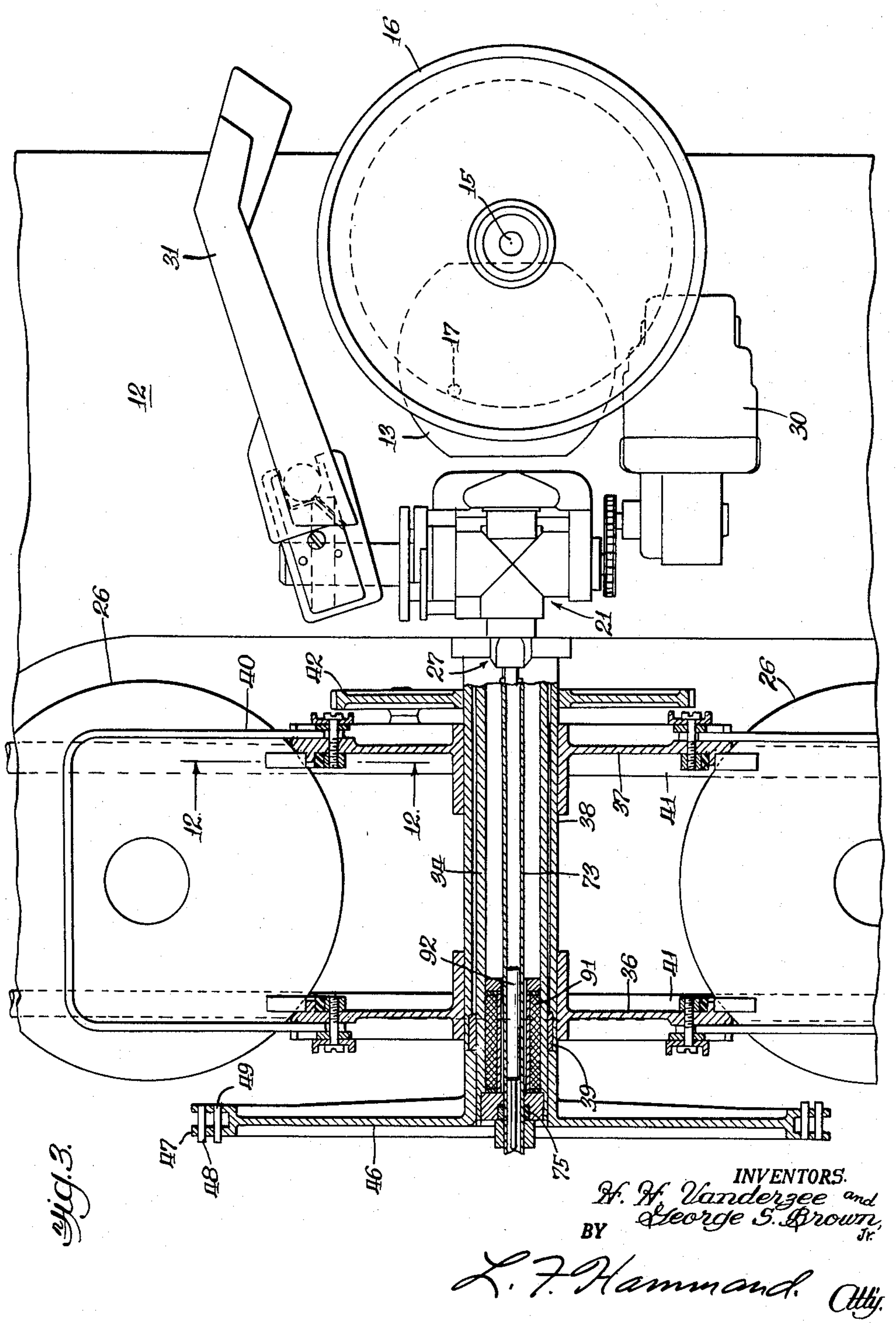
Figure 3 is a fragmental plan view of the record changing mechanism, partly in section on the line 3—3 of Figure 1.

The modification of the invention shown in Figures 6 to 8 differs from the form of Figures 1 to 3 in that, in the modified form of the invention, the magazine is arranged for unidirectional rotation rather than for back and forth motion. Consequently, the action of the turning pins 128 is controlled by a pair of electromagnetic solenoids 145 rather than by the mechanical means previously described.

This embodiment of the invention also includes a selector wheel 146 having a grooved rim 147 in which an outer row of selector stop pins 148 and an inside row of selector stop pins 149 are mounted. The rearward hub disc 136 of the magazine carries a bracket 150 on which are mounted scanning switches 161, with scanning fingers 158 and 159 on suitable shiftable mountings 154 and 156. The mechanism also includes a solenoid 163 having its plunger 164 arranged to operate through a rocker arm 165 pivoted at 166 to move the pins 148 and 149 to their original positions and cancel the selection made thereby as the selected records are played.

In this embodiment of the invention, the scanning arm 171 is of double formation so that its hub 172 may be fitted over the tube 173 in a manner such that rotation of the tube on the bearing 175 will swing two separate rocker arms 176 and 178 on their pivots 177. The end portion of one of these rocker arms 176 is cut away as shown in the drawings so its finger portion 179 is arranged to contact only the outer row of pins 148, while the other arm has a finger portion arranged to contact the inner row of stop pins 149.

The stop pins 148 and 149 are "set" by rocking the arms 176 and 178. To set a pin for any selection the solenoid 191 is energized, causing the core 192 to move its plunger 193 to the left as viewed in Figure 6. It will be understood that this solenoid 191 is electrically energized by appropriate contacts, not shown, in the indexing assembly 203, the arrangement being such as to cause actuation of the solenoid whenever the indexing assembly has operated through gear 201 and pinion 202 to move the arms 176 and 178 into the position of the stop 148—149 corresponding to a selected record.

The scanning control unit with which the present invention is particularly concerned includes a rotatable wheel or drum generally designated as 51, having a central shaft 52 mounted in bearing 53 in a casting 54 affixed to the main frame casting 112. The shaft 52 and the drum wheel 51 are geared for rotation in synchronism with the rotation of the magazine by a ring gear 56 affixed to the forward face of the drum 51 and meshing with a pinion 58 on the forward end of the drive shaft 55 of the traverse motor 144. The shaft 55 is supported on an outboard bearing 59.

The rearward end of the shaft 52 rotates in the bushing 53 and projects rearwardly therefrom, with a small non-metallic friction-drive sleeve 57 extending from the back face of the casting and arranged to be engaged by a full-cycle measuring wheel 291 mounted on a cross shaft 289 carried on a U-shaped floating frame 81 pivoted on a stud 82 extending forwardly from a back plate 83 secured to the casting 54. The cycle measuring wheel 291 is biased in a counter-clockwise direction (as viewed in Figure 7) by a light coil spring 293 encircling the shaft 289 and arranged to hold the rearwardly projecting stop pin 292 on the back surface of the wheel in light engagement with an abutment edge 84 on the back plate of the floating frame 81. The wheel 291 is also held in light frictional edge engagement with the driving sleeve 57 by a tension spring 85 extending between the free end of the floating frame 81 and a lug on the back plate 83. The wheel 291 also includes a forwardly projecting pin 299 arranged to engage the central blade of a stop switch 301 after about one quarter turn of rotation of the cycle measuring element 291. This motion represents slightly more than a full cycle of rotation of the magazine 127.

A pair of electromagnets 302 are mounted immediately below the free end of the floating frame 81. Whenever a selection is made these magnets are energized, causing the frame to be drawn downwardly against the action of the spring 85, momentarily releasing the upper edge of the cycle measuring wheel 291 from the frictional driving sleeve 57. This allows the wheel 291 to snap back to "zero" or starting position (with the stop pin 292 in engagement with the edge of its floating frame) whenever a selection is made.

To prevent unwanted rebound of the cycle wheel 291, it has been found desirable to suspend a semi-circular impact disc 86 on the shaft 289 between the back face of the wheel 291 and the inside of the floating frame 81, balanced to hang so that its upper surface 87 lies just above the abutment edge 84 of the floating frame 81. The stop pin 292 will thus engage the impact disc just before it reaches the abutment 84, and the disc will absorb much of the energy due to motion of the wheel.

From the foregoing, it will be apparent that both embodiments of the invention illustrated provide the record changing mechanism provided with a full-cycle measuring element in the form of a wheel, with electromagnetic means to reset the wheel to zero position upon the making of every selection, and means for stopping the phonograph whenever the cycle measuring element has moved to a point showing that the record magazine has completed one full cycle of movement, since the making of the last selection. In the event that only one selection has been made, this cycle of movement will be completed quite rapidly, with only one stop of the magazine for the playing of the single selected record. If many or all of the records available in the magazine have been selected, however, the progression of the magazine through this single cycle of movement will be interrupted many times, as the playing of each selected record is accomplished. In either event, however, the mechanism will keep the phonograph in a state of continuous operation until all records selected have been played, and then turn it off quite promptly and upon completion of the cycle of movement initiated when the last selections were made, without the need of scanning the entire magazine after the playing of the last record.

Having thus described the invention, what we claim as new and desire to protect by United States Letters Patent is:

1. In an automatic phonograph having a record magazine, a record transfer mechanism, a record player, and a record selector including a series of selector stops each individual to one of the recordings in the magazine, with selective setting devices for individually setting any one of said selector stops, a scanning device driven by a traverse motor and common to a series of said stops and adapted to be moved into proximity with each of said series of stops in succession, and means on said scanning device to actuate the transfer mechanism and record player; in combination with a scanning control unit comprising a stop switch for the aforementioned traverse motor, a full cycle measuring element progressively movable from a zero position to an end position and controlled in said movement by movement of the aforesaid scanning device through at least one full cycle of movement; with means on said measuring element to actuate the stop switch upon reaching said end position, and means to reset said measuring element to zero position upon the actuation of any one of said setting devices.

2. In an automatic phonograph having a record magazine, a record transfer mechanism, a record player, and a record selector including a series of shiftable selector pins each individual to one of the recordings in the magazine, with electromagnetic setting means common to a series of said selector pins for individually shifting the position of any one of said selector pins, a scanning device driven by a traverse motor and common to a series of said pins and adapted to be moved into proximity with each of said series of pins in succession, and a switch on the scanning device to actuate the transfer mechanism and record player upon engagement with any one of said series of pins; in combination with a scanning control unit comprising a stop switch for the aforementioned traverse motor, a full cycle measuring element consisting of a wheel progressively movable from a zero position to an end position and controlled in said movement by movement of the aforesaid scanning device over at least the entire series of selector pins; with means on said wheel to actuate the stop switch upon reaching said end position, biasing means tending to return said wheel to zero position, and means for releasing said wheel from its driving mechanism to reset it to zero position upon the actuation of the electromagnetic setting means.

3. In an automatic phonograph having a record magazine, a record transfer mechanism, a record player, and a record selector including a series of selector stops each individual to one of the recordings in the magazine, with an electromagnetic selector winding for individually setting any one of said selector stops and a scanning device driven by a traverse motor and common to a series of said stops and adapted to be moved into proximity with each of selector stops in succession, and means on said scanning device to actuate the transfer mechanism and record player; in combination with a scanning control unit comprising a stop switch for the aforementioned traverse motor, a full cycle measuring element consisting of a wheel progressively movable from a zero position to an end position and driven by said traverse motor; with means on said wheel to actuate the stop switch upon reaching said end position, and an electromagnetic winding in parallel with the aforementioned selector winding for uncoupling said wheel from the traverse motor and resetting said wheel to zero position.

References Cited in the file of this patent

UNITED STATES PATENTS

| | | |
|---|---|---|
| 1,970,417 | Wahlstrom | Aug. 14, 1934 |
| 2,578,378 | Stolberg | Dec. 11, 1951 |
| 2,665,918 | Jameson | Jan. 12, 1954 |
| 2,673,739 | Gierwiatowski | Mar. 30, 1954 |
| 2,796,263 | Mone | June 18, 1957 |